March 8, 1966 K. R. BELL ETAL 3,239,312
SYSTEM FOR PROCESSING AND ANALYSIS OF LIQUID SAMPLES
Filed April 21, 1965 2 Sheets-Sheet 1
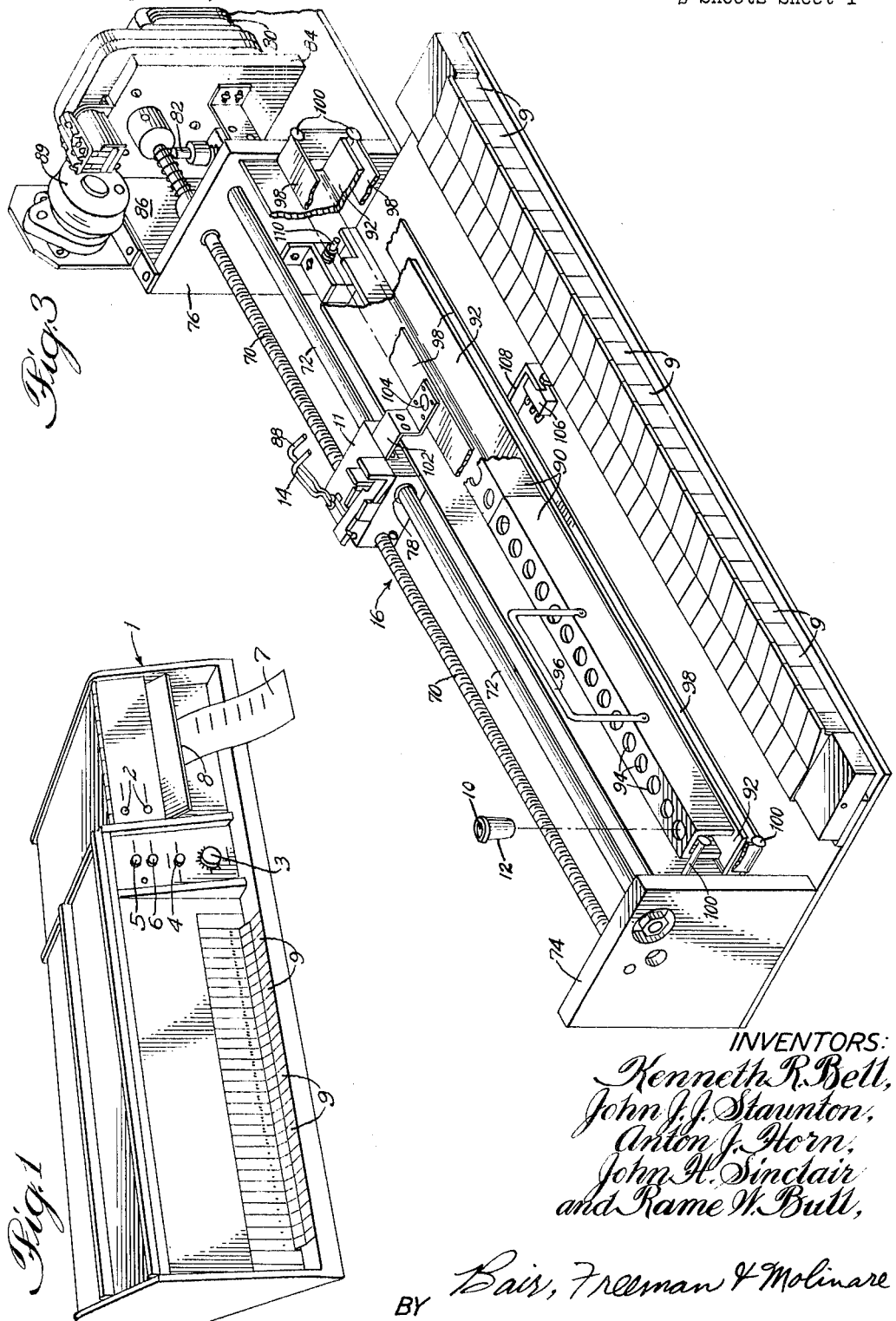
INVENTORS:
Kenneth R. Bell,
John J. J. Staunton,
Anton J. Horn,
John H. Sinclair
and Rame W. Butt,
BY Bair, Freeman & Molinare
ATTORNEYS.

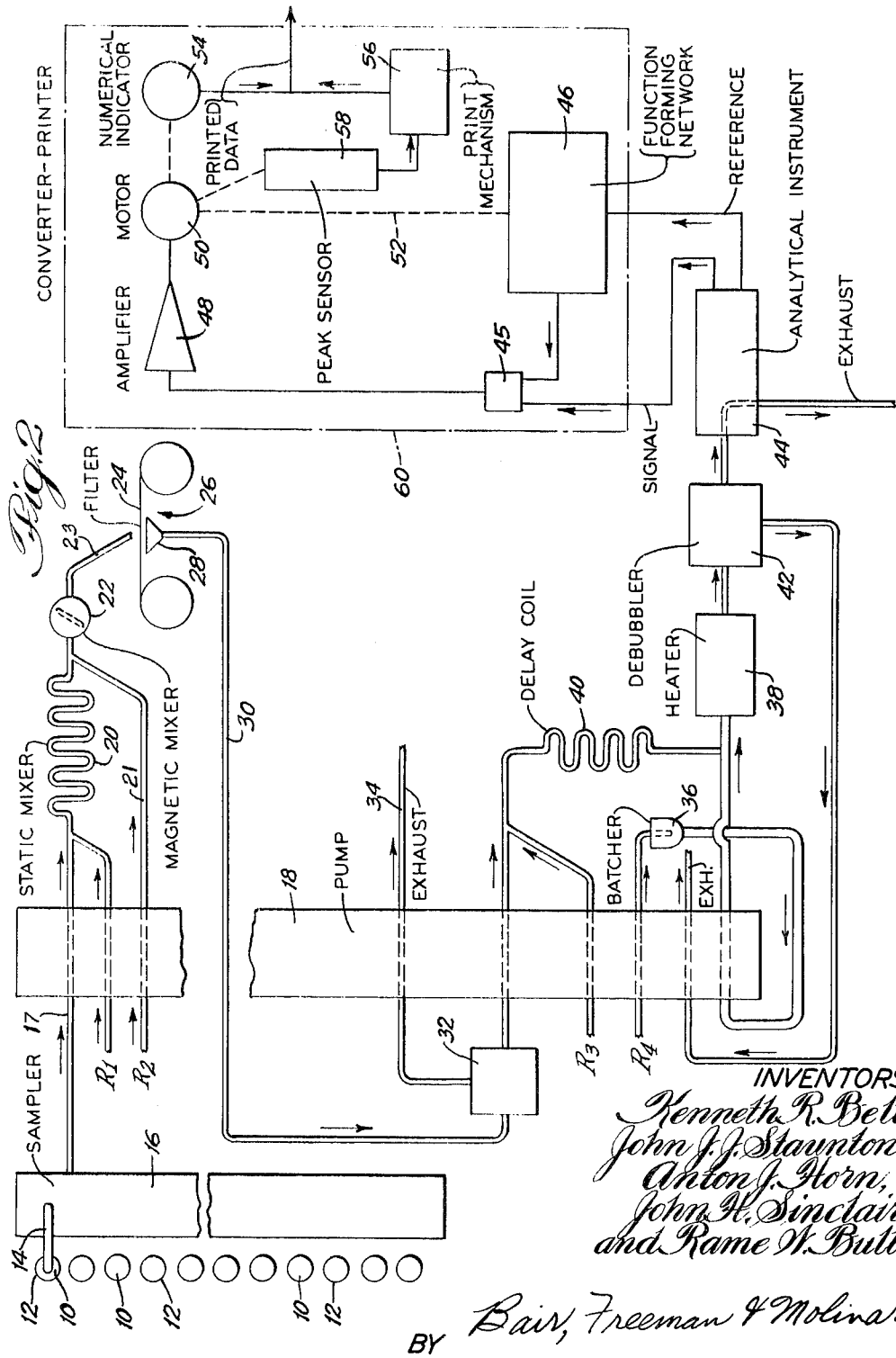

United States Patent Office 3,239,312
Patented Mar. 8, 1966

3,239,312
SYSTEM FOR PROCESSING AND ANALYSIS
OF LIQUID SAMPLES
Kenneth R. Bell, Niles, and John J. J. Staunton, Oak Park,
Ill., Anton J. Horn, St. Louis, Mo., and John H. Sinclair, Chicago, and Rame W. Bull, Mount Prospect, Ill., assignors to Coleman Instruments Corporation, a corporation of Delaware
Filed Apr. 21, 1965, Ser. No. 451,686
8 Claims. (Cl. 23—253)

This invention relates generally to fluid analysis systems and more particularly to an improved method and means to process and analyze liquid samples for determining the concentration of a particular constituent therein. This application is a continuation-in-part of our copending application, Serial No. 177,105, filed March 2, 1962, and now abandoned.

Those skilled in the art of fluid analysis are familiar with the known techniques—both manual and automatic—for processing liquid samples to enable certain constituents therein to be detected and measured. The manual techniques generally require considerable training and skill, and further require an undesirably long period of time for each sample tested.

One of the techniques suggested in the prior art to speed up this process involves a system wherein two fluid streams are caused to flow concurrently, with the liquid samples to be analyzed in the first flowing stream and various processing liquids in the second flowing stream. In this prior art system, a dialyzer device is utilized to position a dialyzer membrane between the two flowing streams so that a portion of the constituent to be analyzed is taken from the first flowing stream and passed through the membrane to mix with the processing liquids of the second flowing stream. The resulting mixture in the second flowing stream then may be analyzed to provide a measurement of the desired constituent. This two flowing stream system, while having some advantages over the manual analysis technique, has not proved entirely satisfactory in actual clinical laboratory and industrial use. For example, the provision and maintenance of two flowing streams is undesirable from the standpoint of cost and space considerations. In addition, the use of a dialyzer device often results in the loss of a considerable portion of the desired constituent during the transfer from the first flowing stream to the second flowing stream through the dialyzer membrane. This limitation often necessitates the use of undesirably large liquid samples.

Accordingly, it is a general object of this invention to provide a new and improved system for fluid analysis which overcomes the problems of the prior art liquid analysis systems.

It is another object of this invention to provide a unique fluid analysis system which requires only one flowing stream in which the desired constituent is maintained for processing and analysis.

It is still another object of this invention to provide a unique fluid analysis system in which a desired constituent in a liquid sample to be analyzed is maintained without separation or transfer from a single, continuously flowing stream throughout the sample processing and analytical portions of the system.

It is a further object of this invention to provide a novel fluid analysis system, as above, in which a desired constituent to be analyzed in a liquid sample is processed in a single flowing stream without any substantial loss of the desired constituent prior to the final analysis.

It is a still further object of this invention to provide a novel method and means for processing and analyzing liquid samples in a single stream capable of using smaller quantities of liquid samples than are required by the two stream systems of the prior art, which is of particular importance when the liquid samples being analyzed comprise blood or other body fluids.

It is a still further object of this invention to provide a new and improved system for automatically processing and analyzing liquid samples which reduces the degree of operator skill required in prior art systems and which eliminates the need for operator interpretation or manipulation of data.

It is still another object of this invention to provide such a new and improved system for automatically processing and analyzing liquid samples, as above, which is characterized by its relatively compact nature, its relative ease of use, and its marked flexibility and adaptability to many different analyses of liquid samples.

The above and other objects are realized in accordance with one illustrative embodiment of this invention which comprises means for flowing a liquid sample in a single steam through a sampling device, a multi-channel pump, a filter device, a batching device, suitable fluid mixing devices, a heater, and suitable analytical and readout apparatus for providing an analysis and record of the presence of a desired constituent in the liquid sample. Those skilled in the art will appreciate, as the description of this invention proceeds hereinbelow, that the individual component elements comprising this specific illustrative embodiment may be replaced by other individual component elements, or in some cases even eliminated, without affecting the novel principles and operation of the unique single flowing liquid sample stream system characterizing the present invention.

In this one illustrative embodiment, the invention advantageously serves to meter, combine, filter, heat and analyze the liquid samples flowing in the single stream of the system and to record the information relating to desired constituents in such liquid samples as a result of the analysis. Towards this end, a series of linearly arranged sample containers are loaded into one or more trays affixed to a programmed sampling device. A snorkel carriage linearly traverses the line of sample containers and, in accordance with a selectable program, removes a specific quantity of liquid sample from the selected containers for analysis. Air is drawn into the tube between immersions into the sample containers to maintain the individual samples in spaced relation. The selected samples, separated by air, are caused to flow in a single stream by suitable pump means which meters the required amounts of reagent liquids and propels them to their respective entry points in the single flowing liquid sample stream.

After a reagent has been added to the liquid samples in the sample flowing stream to precipitate the undesired constituents, the stream flows from the stream conduit or tubing onto a moving filter paper which carries the precipitate away from the flowing stream.

The filtered stream, or filtrate, which contains the constituent to be analyzed, continues to flow through a debubbler where air is removed and exhausted, and the stream then is mixed with additional reagents to further prepare the sample stream for analysis. For example, the reagents added may produce a color change in the sample, the intensity of which is proportionate to the quantity of the constituent being determined. Advantageously, the sample is divided into small batches of liquid separated from each other by air and the sample batches in the single flowing stream are heated to facilitate and hasten the chemical reaction with the reagent prior to analysis. The analysis is effected by a suitable analytical instrument which provides an electrical signal corresponding to the color change or other quantitative indication of the desired constituent of the liquid sample. The electrical signal is used to operate suitable numerical indicators and recording devices to provide visual and/or printed indications of the quantity of the desired constituents being measured.

Thus, it will be appreciated that the novel features characteristic of the present invention reside in the use of a single flowing liquid sample stream which simplifies the system and in addition reduces the loss of the sample constituent to be measured so as to enable the use of smaller liquid samples than that required by the prior art two-stream analytical system.

These and other novel features which are characteristic of the present invention are set forth with particularity in the appended claims. The invention itself, however, both as to its organization and method of operation, together with further objects and advantages thereof, will best be understood by reference to the following description taken in conjunction with the accompanying drawings, in which:

FIGURE 1 is a perspective view illustrating the housing of one illustrative embodiment of a complete system for processing and analyzing liquid samples;

FIGURE 2 is a schematic diagram illustrating one illustrative embodiment of the system and particularly showing the flow path of the liquid sample in a sample processing and analyzing stream; and FIGURE 3 is a perspective view, partially broken away, of one illustrative embodiment of linear programmed sampling devices suitable for use in the present invention.

Referring now to the drawing, and more particularly to FIGURE 1, there is shown an exterior view of one embodiment of the invention as housed in a unitary, relatively compact, attractive housing 1. It will be appreciated that the inventive automatic analyzing system is adapted for use in industrial and clinical laboratories, hospitals, and the like where space may be at a premium. Since the inventive system uniquely requires only a single outflowing liquid sample stream, the components thereof may be arranged within a relatively compact, unitary housing, such as housing 1, which enhances its appearance, space requirements, and simplicity of operation of the system. As shown, the front panel of housing 1 has positioned thereon relatively few controls, which require the attention of an operator thereby reducing the required degree of operator skill. In addition, the housing 1 has provision for a permanent print-out record tape 7, which eliminates the need for operator interpretation or manipulation of data.

Thus, the embodiment illustrated in FIGURE 1 includes a control knob 3 for adjustment of liquid sample size, a power control switch 4, processing start and stop switches 5 and 6, respectively, and the converter-printer controls 2. In addition, the read-out record or tape 7 upon which the analytical results of the measured constituents in liquid sample are printed is shown as being fed out of a suitable slot 8 in the housing to enable the record to be removed and properly associated with its corresponding liquid sample. The selectively actuatable keys or push buttons 9 which control the movement of the snorkel carriage 11 relative to the aligned sample cups 12 are shown in a linear array along the front wall of the housing 1. As explained in greater detail hereinbelow, the linear movement of the snorkel carriage 11 is determined by the keys 9 to properly position the snorkel intake tube 14 for withdrawal of liquid samples 10 from selected sample cups 12 in various desired patterns, thereby eliminating the fixed sampling program of the prior art fluid analysis system sampling devices.

Referring now more specifically to FIGURE 2 of the drawing, the output of the snorkel intake tube 14 is shown as coupled by the tubing or conduit 17 to a proportioning pump 18. Advantageously, the fluid carrying conduits used in this system are flexible tubes selected for their excellence of memory (to permit the tubes to return to their original shape after deformation) and resistance to chemicals and abrasion. The proportioning pump 18 may take the form of any pump adapted to progressively deform the flexible tubing 17 to proportionally pump the liquid samples from the sampler 16 at a constant rate to the rest of the system. Such a pump for example may take the form of the pump disclosed in Owen Patent No. 1,848,024 adapted to accommodate a plurality of flexible tubes. However, those skilled in the art will appreciate that the proportioning pump 18 need not be limited to the specific forms illustrated in the Owen patent and may take any other form capable of causing the individual liquid samples 10, along with the processing reagents, to flow through the tubing of the system at predetermined volume rates of flow. The flow volume per unit time is established by the tube sizes in the proportioning pump 18 while the sampling rate and sampling time (therefore liquid sample size) may be programmed by the dial setting means 3, adjustable timers, push buttons, tape, or the like, into the sampling device 16 for a particular analysis.

In a typical analysis procedure, as illustrated in FIGURE 2 of the drawing, reagent $R_1$ is a conditioning reagent and $R_2$ is a precipitating reagent. The conditioning reagent $R_1$ is added to the single liquid sample stream and is mixed therewith, as by coiled tubing mixer 20. Typical mixers of this type are shown in the patent to Loumiet et Lavigne, No. 2,230,255. The precipitating reagent $R_2$ is added to the single liquid sample stream in the tubing 21 and the combination of liquids in the flowing stream within tubing 21 is passed through a magnetic mixer 22. The magnetic mixer 22, which may be of the type shown in the patent to Rosinger, Patent No. 2,350,534, mixes the liquids as the single stream flows through it to precipitate the undesired constituents in the sample. The stream containing the precipitate flows from the outlet of the magnetic mixer 22 onto a moving filter paper 24 of a filter device 26. Advantageously, the output of the magnetic mixer 22 is placed in close proximity to the moving filter paper 24 in order to minimize the length of the connecting tubing 23, thereby minimizing the possibility of precipitate collecting on the walls of the tubing 23. Reagents $R_1$ and $R_2$ thus function to precipitate out of the single flowing liquid sample stream any substances which might interfere with the subsequent processing and analyzing of the liquid samples.

Positioned below the moving filter paper 24 is a chamber 28 for collection of the filtrate. Essentially, all of the sample stream, minus the precipitate, flows through the filter paper 24 for subsequent processing. Thus, no transfer or appreciable loss of desired sample constituent from the flowing stream has occurred to this point. In addition, the moving filter paper 24 prevents contamination of one sample by another so that the integrity of each sample is maintained without intermixing. The sample stream at the output of the filter 26 flows through a connecting tube 30 to a debubbler device 32 where any air which may have been drawn into the stream as a consequence of filtration is removed and exhausted through tube 34. The partially processed sample stream then continues to flow through the proportioning pump 18 and additional reagents are added and mixed, in predetermined proportions, to further prepare the flowing sample stream for analysis.

In certain analyses, heat may be required to cause, or hasten, the chemical reaction to develop the measurable characteristic change (such as color) of the flowing sample stream. It has been found advantageous to batch the sample stream into small batches of liquid separated from each other by air. This is desirable to reduce the amount of diffusion axially of the stream. One of the objects of this invention is to provide means for processing and analyzing small liquid samples, and if the liquid stream were not broken into small batches, the diffusion in the stream might tend to obliterate short, or small, liquid samples.

The batching of the liquid stream may be accomplished at several points in the system stream flow path downstream of the filter 26, debubbler 32 and pump 18. One preferred arrangement is shown in the embodiment of FIGURE 2 of the drawing, where the reagent $R_4$, or a part thereof, is batched by a suitable batching device 36 and is added to the sample stream upstream of the heater 38, thus batching the flowing sample stream. The batching device 36 may also be placed in the flowing sample stream between the pump 18 and the vertical delay coil 40, or between the vertical delay coil 40 and the heater 38. The concentric batching device 36 is shown with its input and output tubing operatively positioned in the pump 18 and it will be understood that due to the use of differential input and output flow rates resulting from the use of larger diameter tubing at the output of the batching device than at its input, the flowing liquid stream is divided by air into controlled slugs or batches of liquid separated by intervening air segments. After batching, the flowing stream passes from the pump 18 through the heater 38, which causes or accelerates the desired reaction, and thence to the analytical portion of the system.

The analytical portion may take the form of a pH measuring device, a flame photometer, titration device, or, as illustrated in FIGURE 2 of the drawing, a colorimetric measuring device, such as the spectrophotometer 44. The spectrophotometer 44 monitors the processed flowing stream from which unwanted air has been again removed by the debubbler device 42, and in accordance with well known principles of operation produces an electrical voltage proportional to the amount of light transmitted through the processed stream. Advantageously, the processed flowing stream is passed through the spectrophotometer 44 in such a way that essentially point-by-point observations are made, as by having a short segment of the stream always under observation. Thus, a voltage signal is obtained which is a continuous indication of the measured variable constituent in the stream.

If desired, a continuous recording, such as is obtained with pen recorders, can be made directly from the voltage signal output of the analytical instrument 44 and this data can be interpreted in terms of concentration of the desired constituent in the liquid sample 10. With such an arrangement, the basic advantages of this invention, such as maximum utilization of the liquid sample being analyzed (which serves to minimize the size of sample required and the adaptability to many specific analyses) can still be realized.

However, the measured characteristic of the flowing stream, such as percentage of transmission of light therethrough, generally is related to the concentration of the desired constituent in a nonlinear manner. To enhance the advantageous features of this invention and to reduce further the variability due to operator manipulation and possible error, it is another feature of the invention to provide means for automatically converting the nonlinear relationship to a linear indication of desired constituent concentration. Further, this invention provides means for converting the indication to digital form, with means for sensing peaks and valleys in the indicated desired constituent concentration, in a manner such that the concentration in arbitrary or actual units (such as mg. percent) of each liquid sample is printed on a permanent record. These means are embodied in the converter-printer 60 shown in FIGURE 2 of the drawing as connected to the output of the spectrophotometer 44.

This advantageous result is accomplished by taking a reference signal from the analytical instrument 44, which in the illustrative example is a spectrophotometer, and impressing it across a function forming network 46 which matches the relationship between the measured variable (such as percent transmittance or percent T) and concentration.

The voltage on a continuously variable tap on the function-forming network 46 is compared by any suitable comparator device 45 with the signal voltage corresponding to the measured parameter, and by means of an amplifier 48 and motor 50 having a shaft 52 connected to the variable tap, the two signals are caused to be equated. Thus, at equilibrium, the position of the function forming network tap, and therefore, the motor shaft 52, is made to bear a linear relationship to the concentration of the desired constituent. A digital numerical indicator 54, such as a mechanical counter or the like, is linked in a positive manner to the motor 50 to convert the tap position and, therefore, the indicated concentration, to numerical form. Further, the concentration peaks, which occur as each processed sample reaches and passes through the analytical instrument 44, are sensed by a peak sensor 58 and cause a printing mechanism 56 to operate when the peak is reached for printing the number data which appear on the numerical indicator 54.

The actual numerical relationship between the number data indicated and the concentration of the desired constituent is determined by the configuration of the function forming network 46. Since arbitrary relationships can be generated by substituting different types of function forming networks, many different analyses can automatically be interpreted and results printed out merely by exchanging function cards when alternate procedures are set up on the processing part of the system.

The above description of one embodiment of the invention illustrates its facility and considerable advantages in the processing and analysis of liquid samples. In large part, these advantages are achieved by the use of a single, flowing liquid sample stream to which the necessary reagents are added at the proper places in the system. Thus, the disadvantages inherent in the two flowing stream systems of the prior art, which required liquid sample transfer from one stream to another, have been eliminated.

Referring now to FIGURE 3 of the drawing, the illustrative sampling device 16 shown therein serves to provide controlled, uniform liquid samples for processing. Independent control of sample rate and sample time makes possible optimization of a procedure in order to use small quantities of liquid sample without loss of accuracy. This arrangement together with the ability of the system to enable observations of small increments of stream permits the use of small liquid samples. The controlled spacing of the liquid samples is provided by the programmed sampling device to enable proper utilization of readout.

In the sampler embodiment of FIGURE 3, s snorkel carriage is positioned for linear movement on the elongated drive rod 70 and guide rod 72, positioned in parallel spaced relation between the upstanding support walls 74 and 76 of the sampling device 16. Advantageously, guide rod 72 may be fixedly secured to the support walls and slidably positioned through a suitable opening 78 extending through the snorkel carriage 11. The drive rod 70 is rotatably mounted in the support walls and is adapted to be rotatably driven by a drive motor 80 through the selectively operable clutch and actuator assembly 82. The clutch and actuator assembly 82 is positioned between the upstanding support walls 76 and 84, spaced apart by the wall 86, with the drive motor 80 being supported on wall 84.

Advantageously, the drive rod 70 is provided with a suitable external threading which meshes with an internally threaded member within the snorkel carriage 11 to cause the carriage to be moved linearly along the axis of the rods 70 and 72 when the drive motor 80 is clutched to the drive rod 70 to rotate the latter. It is contemplated that the direction of rotation of the drive rod 70 may be reversed as desired to effect the forward or reverse travel of the snorkel carriage 11 on the drive rod 70 and guide rod 72.

The snorkel carriage 11 carries an intake snorkel 14 and if desired, a diluent snorkel 88 pivotally positioned thereon. In operation, the snorkel carriage 11 traverses the linearly aligned array of sample containers 12, positioned in the trays 90, pauses at selected ones of said sample containers and its intake tube 14 removes a specific quantity of sample liquid for analysis. In some procedures, predilution of the liquid sample may be desired, and this is accomplished by a dilution snorkel 88 which upon command, dispenses under the control of the diluent timer 89 a predetermined amount of diluent into the selected sample container.

The sampling device 16 comprises a horizontal, elongated shelf 92 for supporting a plurality of sample trays 90, which may take the form of molded support having openings 94 formed therein to receive the individually molded sample containers 12. If desired, handle means 96 may be provided to facilitate the handling of the sample trays 90. An elongated continuous band or sample container cover 98 is disposed over the guides 100, at each end of the sample supporting shelf 92, for covering all of the individual sample containers 12 with the exception of the sample container directly below the snorkel carriage at any given time. Thus, the container cover 98 is coupled by the bracket 102 to the snorkel carriage 11 for movement therewith. Bracket 102 is provided with an opening 104 extending through the container cover 98 to permit the snorkels to be selectively inserted into a sample container 12 for withdrawing a portion of the sample 10, or for adding a diluent to the samples 10. All timing, sequencing, and interlocking functions are performed by switches, timers and solenoid mounted on the sampling device 16 or the control panel of the housing 1.

Along the front edge of the sampling device 16 and just below the sample trays 90 is a row of switch keys 9. These switch keys 9 act as a memory device and direct the snorkel carriage 11 to remain at or to by-pass a sample position. In operation, upon actuation of the "start" button by the operator the snorkel carriage 11 moves to the first sample position. It will be appreciated by those skilled in the art that the selectively determinable program of operation for the snorkel carriage may be effected by various different forms of suitable control circuits. In the illustrative embodiment of the invention shown in FIGURE 3, the drive motor 80 rotates continuously after it is turned on and the drive rod 70 is selectively clutched thereto by the clutch and actuator assembly 82. Advantageously, the external thread of the drive rod 70 and the internal thread of the snorkel carriage 11 is such that a single revolution of the drive rod 70 causes the snorkel carriage to advance one sample position, at which time the drive rod is declutched from the drive motor. The cyclic operation of the sampler is controlled by suitable timer means such as the timer 89, which determines the sequence of events comprising a sampling operation.

Thus, once the snorkel carriage 11 is positioned above a desired sample container 12, the timer 89 serves to initiate the operations of the intake snorkel 14 and the diluent snorkel 88. The dilution snorkel 88 dips into the sample cup 12 at that position and either adds a diluent or bubbles air into the contents of the cup, at the discretion of the operator.

Immediately after this action, the sampling snorkel or intake tube 14 dips into the sample cup 12 and withdraws a predetermined amount of liquid sample 10 therefrom. When this action is completed, the drive rod 70 is again clutched to the drive motor 80 by the clutch and actuator assembly 82, and the snorkel carriage 11 moves to the next sample position. However, if upon reaching this posiiton, the corresponding key 9 is depressed, the switch 106 carried by the snorkel carriage bracket 108 is caused to be operated to recycle the timer for another sequence. This results in the sample position being by-passed by the snorkel carriage 11, and the carriage proceeds to the next position, etc., until all sample positions have been scanned. After leaving the last position, the carriage 11 contacts a shut-off switch 110 and the sampling device 16 is de-energized.

In certain instances, the system may be applied to continuous monitoring of a solution or stream, in which case the sampling device 16 may be omitted and a continuous liquid sample pumped into the system. Even under this type of operation, the diversion of a minimum amount of liquid sample is of advantage in some applications of continuous monitoring.

The proportioning pump 18 advantageously provides for the flow of the liquid sample and processing liquids. Pump 18 also provides means for proportioning reagents and liquid samples in the constant manner necessary for correct processing prior to analysis.

The movable filter device 26 is useful in many applications where interfering or undesired substances are present in the liquid sample stream. When a procedure is used which is not sensitive to extraneous materials in the liquid sample stream, the filter device 26 may be omitted without loss of other advantageous features of the system. When the filter device 26 is used, the moving filter paper 24 enhances sampling and observation optimization in minimizing the liquid sample size requirements as by the efficient extraction of the interfering substances from the flowing stream without substantial loss of desired constituent material to be analyzed. In addition, the moving filter paper 24 prevents any intermixing or contamination of one sample by another sample in the stream.

The heater 38 is desirable in some applications to cause or accelerate the reactions required in the analysis procedure. In analyzing for certain constituents, this heating function is not required and the heater 38 may be omitted without loss of the other advantageous features and objectives of the invention.

The analytical instrument 44 provides the conversion of a measurable physical characteristic to an appropriate electrical signal. An important feature of the procedure illustrated in the drawing is the observation of the processed liquid sample in a short segment of the flowing stream in order to obtain an essentially point-by-point observation, thus facilitating the realization of minimum liquid sample quantity use.

The converter-printer 60 provides an additional advantage in the inventive system in that it enhances the automatic features and eliminates the need for manual interpretation or manipulation of data. As such, the converter-printer 60 cooperates with other elements of the system in minimizing operator functions and possibility for error. However, it will be appreciated by those skilled in the art that any type of indicator can be used to provide indications of the sample analysis in lieu of the exemplary embodiment of converter-printer here described. In fact, if desired, the system of this invention may be operated with only a meter at the output of the analytical instrument 44 and the converter-printer 60 eliminated entirely. Thus, the use of a converter-printer, while advantageous in many instances, is not to be considered as necessary to the successful operation and use of the single flowing liquid sample stream analytical system comprising the invention.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. In a system for the processing and analysis of liquid samples, the improvement of apparatus for analyzing a desired constituent in a liquid sample comprising a plurality of liquid sample containers aligned in a linear array; sampling apparatus operatively associated with said linear array of liquid sample containers and mounted for linear movement in a direction parallel to said linear array of sample containers, said sampling apparatus including sample intake means operable to withdraw liquid samples from selected ones of said sample containers, selectively actuatable means for controlling the movement of said sampling apparatus to align the sample intake means in operative sample withdrawing position with selected ones of said sample containers, analytical apparatus for analyzing the concentration of a desired constituent in said liquid samples and for providing indications thereof, stream defining means connected between the output of said sample intake means and the input of said analytical apparatus for forming a single flowing stream of said liquid samples whereby said desired constituent is substantially maintained without loss in each liquid sample flowing in the stream to permit the use of relatively small quantities of said liquid samples, means for adding processing reagents to said single flowing stream to precipitate undesirable constituents in the liquid samples, filter means in the path of said single flowing stream for removing the precipitated undesirable constituents therefrom, proportioning pump means operatively associated with said stream defining means for causing said liquid samples in the single stream to flow from the sampling apparatus to the analytical apparatus, and batching means in the path of said single flowing stream between said filter means and said analytical apparatus for dividing said single flowing stream into batches of liquid samples separated from each other by air.

2. In a system for the processing and analysis of liquid samples, the improvement of apparatus for analyzing a liquid sample for a desired constituent comprising a plurality of liquid sample containers aligned in a linear array; sampling apparatus operatively associated with said linear array of liquid sample containers and mounted for linear movement in a direction parallel to said linear array of sample containers, said sampling apparatus including sample intake means operable to withdraw liquid samples from selected ones of said sample containers, selectively actuatable means for controlling the movement of said sampling apparatus to align the sample intake means in operative sample withdrawing position with selected ones of said sample containers, analytical apparatus for analyzing the concentration of a desired constituent in said liquid samples and for providing indications thereof, stream defining means connected between the output of said sample intake means and the input of said analytical apparatus for forming a single flowing stream of said liquid samples whereby said desired constituent is substantially maintained without loss in each liquid sample flowing in the stream to permit the use of relatively small quantities of said liquid samples, means for adding processing reagents to said single flowing stream to precipitate undesirable constituents in the liquid samples, filter means in the path of said single flowing stream for removing the precipitated undesirable constituents therefrom, and batching means in the path of said single flowing stream between said filter means and said analytical apparatus for dividing said single flowing stream into batches of liquid samples separated from each other by segments of air.

3. In a system for the processing and analysis of liquid samples, the improvement of apparatus for analyzing a liquid sample for a desired constituent comprising a plurality of liquid sample containers aligned in a linear array; sampling apparatus operatively associated with said linear array of liquid sample containers and mounted for linear movement in a direction parallel to said linear array of sample containers, said sampling apparatus including sample intake means operable to withdraw liquid samples from selected ones of said sample containers, selectively actuatable means for controlling the movement of said sampling apparatus to align the sample intake means in operative sample withdrawing position with selected ones of said sample containers, analytical apparatus for analyzing the concentration of a desired constituent in said liquid samples and for providing indications thereof, stream defining means connected between the output of said sample intake means and the input of said analytical apparatus for forming a single flowing stream of said liquid samples whereby said desired constituent is substantially maintained without loss in each liquid sample flowing in the stream to permit the use of relatively small quantities of said liquid samples, means for adding processing reagents to said single flowing stream to precipitate undesirable constituents in the liquid samples, and filter means in the path of said single flowing stream for removing the precipitated undesirable constituents therefrom.

4. In a system for the processing and analysis of liquid samples, the improvement of apparatus for analyzing a liquid sample for a desired constituent comprising a plurality of liquid sample containers aligned in a linear array; sampling apparatus operatively associated with said linear array of liquid sample containers and mounted for linear movement in a direction parallel to said linear array of sample containers, said sampling apparatus including sample intake means operable to withdraw liquid samples from selected ones of said sample containers, selectively actuatable means for controlling the movement of said sampling apparatus to align the sample intake means in operative sample withdrawing position with selected ones of said sample containers, analytical apparatus for analyzing the concentration of a desired constituent in said liquid samples and for providing indications thereof, stream defining means connected between the output of said sample intake means and the input of said analytical apparatus for forming a single flowing stream of said liquid samples whereby said desired constituent is substantially maintained without loss in each liquid sample flowing in the stream to permit the use of relatively small quantities of said liquid samples, proportioning pump means operatively associated with said stream defining means for causing said liquid samples in the single stream to flow from the sampling apparatus to the analytical apparatus, and batching means in the path of said single flowing stream for dividing said single flowing stream into batches of liquid samples separated from each other by air.

5. In a system for the processing and analysis of liquid samples, the improvement of apparatus for analyzing a liquid sample for a desired constituent comprising a plurality of liquid sample containers aligned in a linear array; sampling apparatus operatively associated with said linear array of liquid sample containers and operable to withdraw liquid samples from selected ones of said sample containers, analytical apparatus for analyzing the concentration of a desired constituent in said liquid samples and for providing indications thereof, stream defining means connected between the output of said sample intake means and the input of said analytical apparatus for forming a single flowing stream of said liquid samples whereby said desired constituent is substantially maintained without loss in each liquid sample flowing in the stream to permit the use of relatively small quantities of said liquid samples, and proportioning pump means operatively associated with said stream defining means for causing said liquid samples in the single stream to flow from the sampling apparatus to the analytical apparatus.

6. The improvement of apparatus for analyzing a liquid sample for a desired constituent in accordance with claim 5 which further comprises filter means in the path of said single flowing stream for removing undesired constituents therefrom.

7. The improvement of apparatus for analyzing a liquid sample for a desired constituent in accordance with claim 6 which further comprises batching means in the path of said single flowing stream between said filter means and said analytical apparatus for dividing said single flowing stream into batches of liquid samples separated from each other by air.

8. In a system for the processing and analysis of liquid samples, the improvement of apparatus for analyzing a liquid sample for a desired constituent comprising a liquid sample container, sampling apparatus including sample intake means operable to withdraw a liquid sample from said sample container, analytical apparatus for analyzing the concentration of a desired constituent in said liquid sample and for providing indications thereof, stream defining means connected between the output of said sample intake means and the input of said analytical apparatus for forming a single flowing stream of said liquid sample whereby said desired constituent is substantially maintained without loss in the stream to permit the use of a relatively small quantity of said liquid sample, means for adding processing reagents to said single flowing stream to precipitate undesirable constituents in the liquid sample, filter means in the path of said single flowing stream for removing the precipitated undesirable constituents therefrom, batching means in the path of said single flowing stream between said filter means and said analytical apparatus for dividing said single flowing stream into batches of liquid samples separated from each other by air, and debubbling means in the path of said single flowing stream at a point intermediate said filter means and said analytical apparatus for removing undesired air which has been drawn into the single flowing stream at the filter means.

References Cited by the Examiner

UNITED STATES PATENTS

| | | | |
|---|---|---|---|
| 1,943,684 | 1/1934 | Martin et al. | 23—253 X |
| 2,797,149 | 6/1957 | Skeggs | 23—253 X |
| 2,879,141 | 3/1959 | Skeggs | 23—253 |
| 2,967,764 | 1/1961 | Skeggs | 23—253 |
| 2,999,673 | 9/1961 | Kessler | 23—253 |
| 3,098,719 | 7/1963 | Skeggs | 23—253 |

FOREIGN PATENTS 21,142     1901    Great Britain.

MORRIS O. WOLK, *Primary Examiner.*